Figure 1:
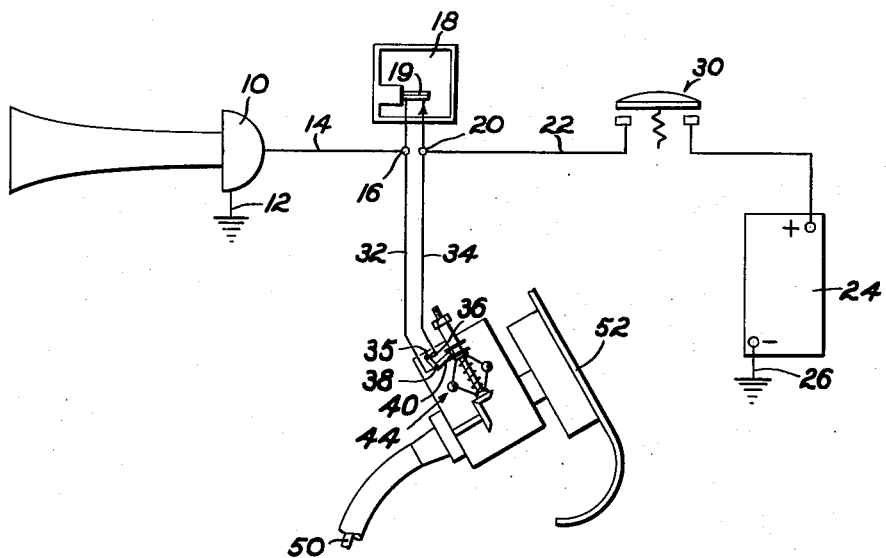

Oct. 12, 1948.                L. D. BELL                 2,450,933
                             HORN CONTROL
                          Filed April 5, 1946

INVENTOR
Lawrence D. Bell
BY
Beau, Brooks, Buckley & Beau.
ATTORNEYS

Patented Oct. 12, 1948

2,450,933

UNITED STATES PATENT OFFICE 2,450,933

HORN CONTROL

Lawrence D. Bell, Eggertsville, N. Y., assignor to Bell Aircraft Corporation, Wheatfield, N. Y.

Application April 5, 1946, Serial No. 659,706

5 Claims. (Cl. 177—7)

1

This invention relates to a system for control of a signal device such as an automobile horn or the like; and more particularly to a horn control device which operates automatically to permit the controlled horn to emit sounds of varying intensities commensurate with the speed of travel of the mounting vehicle.

For example, the invention contemplates a horn control system for automobiles or the like whereby when travelling at relatively low speeds operator-actuation of the usual horn control pushbutton on the automobile steering column will result in production of a modulated horn signal of the intermittent and/or subdued "courtesy toot" type; whereas under higher travel speed conditions the same actuation of the horn control button will procure usual, full volume horn signals for as long as the horn control button is depressed. Thus, full intensity blasts will issue from the horn under conditions when this is necessary from the standpoint of safety, while only subdued "courtesy signals" will issue from the horn under less urgent traffic conditions, as when the automobile is at standstill or proceeding slowly.

One of the objects of the invention is to provide an improved horn control system of the character described, whereby the features set forth hereinabove are attained.

Another object of the invention is to provide an improved horn sound regulating device for the purposes set forth hereinabove, which device is of improved structural simplicity.

Another object of the invention is to provide a device as set forth hereinabove which is readily adapted either to be installed as an accessory upon presently operating automobiles or the like, or as original equipment.

Another object of the invention is to provide a device of the character described which may be adjusted as to the timing of the intermittent energization of the horn under subdued operation conditions, and also as to the vehicle speed limit for the subdued horn operation.

Other objects and advantages of the invention will appear from the specification hereinafter.

Figure 2:
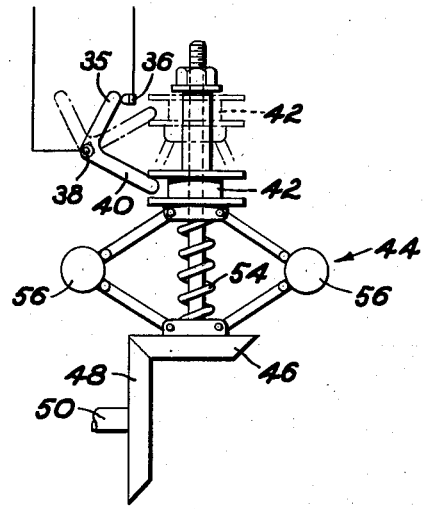

In the drawings:

Fig. 1 is a diagrammatic illustration of an automobile horn control arrangement of the invention; and Fig. 2 is an enlarged view of a detail thereof.

The invention is illustrated as being applied to control a standard type automobile electric horn designated 10; the horn 10 having a ground connection as indicated at 12. The other terminal

2 of the horn connects to a conductor 14 which leads to one terminal 16 of an automatic make-break switch 18. The switch 18 may be of any suitable intermittent circuit type, and may include for example a conductor arm 19 of bimetal which alternately arches away from circuit closing position subsequent to a predetermined time of flow of current therethrough and then returns to circuit closing position after cooling, thereby permitting only intermittent current flow through the conductor 14. The other terminal 20 of the switch 18 connects to a conductor 22 leading to one terminal of the automobile battery 24; the other terminal of the battery 24 being connected to a ground conductor 26 to complete the primary horn circuit. A normally open horn control switch 30 is coupled into the line of the conductor 22; the switch 30 being preferably a spring urged push-button type switch such as is customarily mounted in the end of the conventional automobile steering control column.

Thus, it will be understood that the portion of the horn control mechanism so far described is adapted to initiate a horn sounding operation immediately upon depression of the push-button 30 by the automobile operator. However, coincident with such commencement of a horn sounding operation the switch 18 will be thereby energized to alternately open and close the circuit including the conductors 14—22. Since the current so supplied to the horn is of constantly interrupted form the attempts of the horn to attain full scale sounding operation are likewise being constantly interrupted, and the horn is thereby attaining a maximum sound intensity operation. Thus, the above described portion of the control system of the invention is adapted to control the horn so as to emit only interrupted sounds of relatively subdued intensity, such as are ample to provide traffic warnings under low speed travel conditions or to otherwise signal whenever the automobile is at standstill.

The invention contemplates however that the horn control system be automatically conditioned also for high speed traffic conditions so that operator-pressure against the push-button 30 will cause the horn to operate uninterruptedly and at maximum intensity whenever the automobile is travelling at higher speeds. For this purpose I employ a shunt circuit comprising conductors 32—34 and a shunt control switch 35. The conductor 32 couples at one end to the connector 16 and at its other end to the switch lever 35, while the conductor 34 couples at one end to the connector 20 and at its other end to a switch contactor 36. The switch lever 35 is pivoted upon the automobile frame as at 38, and is formed with a crank arm 40 which extends into geared relation with a vehicle speed responsive device such as the displacement portion 42 of a centrifugal type governor indicated generally at 44. The governor 44 is keyed to a bevel gear 46 which meshes in turn with a gear 48 carried by a torque shaft 50 which may comprise, for example, the drive shaft of the mileage and speed meter 52 such as is usually mounted in the instrument panel of present day automobiles.

The shunt circuit control switch 35 and the governor device elements are so constructed and arranged that as long as the automobile is at standstill or moving at relatively low speed, say for example under twenty miles per hour, the spring device 54 of the governor mechanism will operate to maintain the displacement portion 42 of the governor mechanism in its upper limit position as shown by broken lines in Fig. 2. Under such conditions the switch member 35 will be held over in its circuit-open position, thereby rendering the shunt circuit inoperative. However, as soon as the automobile attains a speed above the preselected limit the inertia devices 56—56 of the governor mechanism will be rotated at correspondingly higher speeds and centrifugal forces thereof will overcome the force of the spring 54 whereby the displacement member 42 will be pulled downwardly such as to the solid line position thereof shown in Fig. 2. Under such conditions the switch device 35 will be pulled over to contact the point 36, thereby closing the shunt circuit 32—34 and in this manner the current interrupter switch 18 will be by-passed, and an uninterrupted and full supply of current will flow from the battery 24 to the horn as long as the push-button 30 is depressed by the automobile operator. Thus, under high travel speed conditions when relatively loud and uninterrupted sound blasts are required for safe driving, the full power of the horn will be available for control by the automobile operator as he sees fit to manipulate the push-button 30.

It is to be understood that the automatic current interrupter switch 18 may be supplied of adjustable form so that the time cycle of the circuit make and break sequence may be regulated according to traffic requirements. Also, it may be arranged that the governor and shunt switch mechanisms may be suitably adjusted as required so as to cause the shunt circuit to by-pass the current interrupter 18 at any desired speed of automobile travel. Preferably, however, the adjustments mentioned hereinabove will be arranged so as to be made by a mechanic at an automobile service station and then locked and sealed in the selected conditions of adjustment.

I claim:

1. A horn control system for automobiles comprising an operating circuit, sound producing means controlled by said circuit, a source of electric current supply, a single manually controlled and normally open switch, an automatic make-and-break switch device continuously actuated during energization substantially at constant frequency and independently of vehicle speed, said sound means, said manual switch, and said make-and-break switch being connected in said operating circuit in series with each other, a shunt circuit directly connected in parallel with said make-and-break switch to by-pass the last mentioned switch and to allow maximum current to flow to the sounding means, a normally open control switch for closing said shunt circuit, and means geared to the automobile for movement in response to variations of speed of travel thereof, said last mentioned means being coupled to said shunt switch for actuation thereof to closed position during operation of the automobile under speeds exceeding a preselected speed of travel.

2. A horn control system for automobiles comprising an operating circuit, an electric horn controlled by said circuit, a source of electric current supply, a single manually controlled and normally open switch, an automatic make-and-break switch device continuously actuated during energization substantially at constant frequency and independently of vehicle speed, said electric horn, said manual switch, and said make-and-break switch being connected in said operating circuit in series with each other, a shunt circuit directly connected in parallel with said make-and-break switch to by-pass the last mentioned switch and to allow maximum current to flow to said horn, a normally open control switch for closing said shunt circuit, and means geared to the automobile for movement in response to variations of speed of travel thereof, said last mentioned means being coupled to said shunt switch for actuation thereof to closed position during operation of the automobile under speeds exceeding a preselected speed of travel.

3. A horn control system for automobiles comprising an operating circuit, an electric horn controlled by said circuit, a source of electric current supply, a single manually controlled and normally open switch constantly actuated during energization substantially at constant frequency and independently of vehicle speed, a thermally-actuated intermittent switch, said electric horn, said manual switch, and said intermittent switch being connected in said operating circuit in series with each other, a shunt circuit directly connected in parallel with said intermittent switch to by-pass the last mentioned switch and to allow maximum current to flow to said horn, a normally open control switch for closing said shunt circuit, and means geared to the automobile for movement in response to variations of speed of travel thereof, said last mentioned means being coupled to said shunt switch for actuation thereof to closed position during operation of the automobile under speeds exceeding a preselected speed of travel.

4. A horn control system for automobiles comprising an operating circuit, an electric horn controlled by said circuit, a source of electric current supply, a single manually controlled and normally open switch, a modulator operable during energization at continuous and substantially constant frequency independently of vehicle speed to permit only an interrupted flow of current through said operating circuit when said manual switch is closed, said electric horn, said manual switch, and said modulator being connected in said operating circuit in series with each other, a shunt circuit directly connected in parallel with said modulator to by-pass the last mentioned switch and to allow maximum current to flow to said horn, a normally open control switch for closing said shunt circuit, and means geared to the automobile for movement in response to variations of speed of travel thereof, said last mentioned means being coupled to said shunt switch for actuation thereof to closed position during operation of the automobile under speeds exceeding a preselected speed of travel.

5. A horn control system for automobiles comprising an operating circuit, an electric horn controlled by said circuit, a source of electric current supply, a single manually controlled and normally open switch, an automatic make-and-break switch device continuously actuated during energization substantially at constant frequency and independently of vehicle speed, said electric horn, said manual switch, and said make-and-break switch being connected in said operating circuit in series with each other, a shunt circuit directly connected in parallel with said make-and-break switch to by-pass the last mentioned switch and to allow maximum current to flow to said horn, a normally open control switch for closing said shunt circuit, and centrifugally actuated governor means geared to the automobile for movement in response to variations of speed of travel thereof, said last mentioned means being coupled to said shunt switch for actuation thereof to closed position during operation of the automobile under speeds exceeding a preselected speed of travel.

LAWRENCE D. BELL.

REFERENCES CITED

The following references are of record in the file of this patent:

UNITED STATES PATENTS

| Number | Name | Date |
|---|---|---|
| 2,283,659 | White | May 19, 1942 |
| 2,340,502 | Baker | Feb. 1, 1944 |
| 2,347,784 | La Rocca | May 2, 1944 |
| 2,365,823 | Joyce | Dec. 26, 1944 |